US011005709B2

(12) United States Patent
Falk et al.

(10) Patent No.: US 11,005,709 B2
(45) Date of Patent: May 11, 2021

(54) METHOD AND A SYSTEM FOR THE DETERMINISTIC AUTOCONFIGURATION OF A DEVICE

(71) Applicant: SIEMENS AKTIENGESELLSCHAFT, Munich (DE)

(72) Inventors: Rainer Falk, Poing (DE); Steffen Fries, Baldham (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 53 days.

(21) Appl. No.: 15/121,433

(22) PCT Filed: Apr. 1, 2015

(86) PCT No.: PCT/EP2015/057207
§ 371 (c)(1),
(2) Date: Aug. 25, 2016

(87) PCT Pub. No.: WO2015/155093
PCT Pub. Date: Oct. 15, 2015

(65) Prior Publication Data
US 2017/0026236 A1    Jan. 26, 2017

(30) Foreign Application Priority Data
Apr. 11, 2014    (DE) .................... 10 2014 206 989.0

(51) Int. Cl.
*H04L 12/24*    (2006.01)
*H04W 76/11*    (2018.01)
(Continued)

(52) U.S. Cl.
CPC .... *H04L 41/0809* (2013.01); *H04L 12/40078* (2013.01); *H04L 41/0886* (2013.01);
(Continued)

(58) Field of Classification Search
None
See application file for complete search history.

(56) References Cited

U.S. PATENT DOCUMENTS 9,253,034 B1 * 2/2016 Krishnamurthy ... H04L 41/0889
9,491,643 B2 * 11/2016 Hapsari ................. H04W 24/08
(Continued)

FOREIGN PATENT DOCUMENTS

CN    1617515 A    5/2005
DE    102005041055 A1    3/2007
(Continued)

OTHER PUBLICATIONS

International Search Report PCT/EP2015/057207; International Filing Date: Apr. 1, 2015; 2 Pgs.
(Continued)

*Primary Examiner* — Younes Naji
(74) *Attorney, Agent, or Firm* — Schmeiser, Olsen & Watts LLP

(57) ABSTRACT

A method for deterministic auto-configuration of a device upon connection to an apparatus includes as a first step, during a first-time connection of the device to the apparatus, a generation of a device-specific configuration data structure, wherein this configuration data structure identifies the configuration data of the device and/or the apparatus, which configuration data was determined during a first-time connection of the device to the apparatus. The next step is storing of the configuration data structure in the device and/or in the apparatus. During a renewed connection of the device to the apparatus, the first-time configuration data of the device and/or the apparatus is determined by means of the configuration data structure, and the device and/or the
(Continued)

apparatus correspondingly furnishes the first-time configuration data. The system is equipped in such a way as to execute the stated method.

18 Claims, 2 Drawing Sheets

(51) Int. Cl.
*H04L 12/40* (2006.01)
*H04W 12/069* (2021.01)

(52) U.S. Cl.
CPC .......... *H04W 12/069* (2021.01); *H04W 76/11* (2018.02); *H04L 2012/4026* (2013.01)

(56) References Cited

U.S. PATENT DOCUMENTS

| | | | |
|---|---|---|---|
| 2004/0044744 A1 | 3/2004 | Grosner et al. | |
| 2004/0073747 A1* | 4/2004 | Lu | G06F 3/0605 711/114 |
| 2005/0108369 A1 | 5/2005 | Sather et al. | |
| 2006/0072477 A1* | 4/2006 | Bodlaender | H04L 67/303 370/254 |
| 2007/0260738 A1* | 11/2007 | Palekar | G06F 21/577 709/229 |
| 2008/0125077 A1* | 5/2008 | Velazquez | H04L 12/66 455/404.2 |
| 2008/0280592 A1* | 11/2008 | McCown | H04L 9/3247 455/411 |
| 2010/0011085 A1* | 1/2010 | Taguchi | H04L 67/1097 709/214 |
| 2010/0042987 A1 | 2/2010 | Yamada | |
| 2010/0205281 A1 | 8/2010 | Porter et al. | |
| 2010/0250719 A1* | 9/2010 | Klug | H04L 69/18 709/222 |
| 2013/0036311 A1* | 2/2013 | Akyol | H04L 9/3247 713/189 |
| 2014/0196142 A1* | 7/2014 | Louboutin | H04W 12/08 726/16 |
| 2014/0206336 A1* | 7/2014 | Li | H04W 24/02 455/419 |
| 2015/0046994 A1* | 2/2015 | Sinha | H04L 41/0806 726/7 |

FOREIGN PATENT DOCUMENTS

| | | |
|---|---|---|
| DE | 102010033230 A1 | 2/2012 |
| DE | 102010063437 A1 | 6/2012 |
| WO | WO-2012178019 A2 * 12/2012 | ......... G06F 21/6209 |
| WO | WO 2014047666 A1 | 4/2014 |

OTHER PUBLICATIONS

Non-English Chinese Office Action dated Sep. 27, 2020 for Application No. 201580019236.2.

* cited by examiner

METHOD AND A SYSTEM FOR THE DETERMINISTIC AUTOCONFIGURATION OF A DEVICE

CROSS-REFERENCE TO RELATED APPLICATIONS

This application claims priority to PCT Application No. PCT/EP2015/057207, having a filing date of Apr. 1, 2015, based off of DE Application No. 102014206989.0 having a filing date of Apr. 11, 2014, the entire contents of which are hereby incorporated by reference.

FIELD OF TECHNOLOGY

The following relates to an apparatus and a method for the deterministic autoconfiguration of a device in the course of connection to an apparatus.

BACKGROUND

An automatic configuration of a device in the course of connection to another device or an apparatus, which is also designated as plug-and-play functionality, is known in the case of computers, which are supplemented, for example, by additional internal or external components, such as, for example, a memory expansion, a hard drive, or a computer mouse. An automatic configuration of devices via an IP-based network is also known, for example under the designation "universal plug-and-play". However, autoconfiguration, or plug-and-play functionality, also plays an important role in automation systems. By the autoconfiguration of field and control devices an automation system can easily be set up. DE 10 2010 063 437 A1 describes, for example, a method for the configuration of one or a plurality of devices in an Ethernet-based communications network with which a location-dependent automatic configuration of the devices is enabled in a simple manner.

There exists on the other hand, however, the requirement that an automation system, for example, or even a train control and train communications system, functions reliably. For this purpose a fixed configuration would be advantageous. Regulations can also require that only one particular inspected and approved configuration is used in regular operation.

To utilize the requirements for stable network operation with functioning or else authorized configurations for devices that are only plugged into an apparatus or connected to the latter temporarily, and may also be required to be plugged into various apparatuses a number of times, the previous autoconfiguration methods are not suitable. For example, in some operating systems, such as Windows 7, or firmware, such as for example, the BIOS, a non-volatile database is used for extended system configuration data (ESCD), which stores plug-and-play configurations. The said ESCD database is used by the operating system to allocate resources and configuration data for devices such as expansion components. The operating system updates such a configuration database whenever the hardware configuration alters after a new allocation of resources is determined. Thus, in the event of a temporary unplugging and a later reconnection of the device to the apparatus, an automatic configuration of the device is not ensured that the device is connected with the same configuration that was used previously.

SUMMARY

An aspect relates to adjusting the flexibility of an auto-configuration function, for example, when applied in an automation environment, such that stable operation is ensured.

The inventive method for the deterministic autoconfiguration of a device in the course of connection to an apparatus comprises as a first step the generation of a device-specific configuration data structure in the event of a first-time connection of the device to the apparatus, wherein the said configuration data structure identifies the configuration data of the device and/or the apparatus, which configuration data have been determined in the course of a first-time connection of the device to the apparatus. The next step is the storage of the configuration structure in the device and/or in the apparatus. In the event of a renewed connection of the device to the apparatus, the first-time configuration data of the device and/or the apparatus are determined by means of the configuration data structure, and the device and/or the apparatus is/are set up in accordance with the first-time configuration data.

A first-time connection is characterized in that no configuration data structure is present that can be assigned to the apparatus and/or to the device. In the context of embodiments of the invention, a first-time connection can therefore e.g. also exist if a stored configuration data structure has been deleted, or marked as invalid, or if to date connections have only been made in which no configuration data structure has been generated and stored.

This enables a device or the apparatus, into which the device is plugged, or to which the device is connected, to be configured in the same manner as was the case in a first-time connection of the device to the apparatus. Thus a device can be flexibly deployed, and when it is reconnected to the apparatus its previous configuration can simply be reproduced.

In an advantageous form of an embodiment, fixedly prescribed device identification information, which is transmitted from the device at least in the case of the first-time connection to the apparatus for the purposes of identifying the device, is recorded in the configuration data structure and the first-time configuration data of the device and/or the apparatus are determined by means of the device identification information.

This makes it possible for no information concerning the first-time configuration data or else only the configuration data structure to be stored on the device itself. In the event of a renewed connection of the device to the apparatus, and the transmission of the device identification information from the device to the apparatus, the first-time configuration data can be identified by means of the device identification information in the apparatus, and can be transmitted to the device. The device can thus be a component with a simple structure, for example, a sensor in an automation network, which does not need any memory capacity for the purposes of storing a configuration data structure or the first-time configuration data itself. All that is needed is memory capacity in the apparatus for the configuration data structure and the first-time configuration data.

In a further form of an embodiment, the configuration data structure comprises a configuration identifier, which is determined in the course of a first-time connection of the device to the apparatus.

If, for example, the configuration data structure is stored in the device and in the apparatus, then, in the event of a renewed connection of the device to the apparatus, the device can transmit the configuration identifier to the apparatus, and via the configuration identifier can determine the associated first-time configuration data in the apparatus. The configuration data are then transferred to the device, and the device, and possibly also the apparatus, is configured in accordance with the configuration data. This makes possible a simply structured look-up table in the apparatus, and thus an autoconfiguration of the device and the apparatus that can be executed in a short period of time. Thus, the same configuration identifier can be used for various devices with, for example, various items of device identification information, since in the event of a renewed connection of the device to the apparatus the configuration data are identified by means of the configuration identifier, and not, for example, by means of the device identification information itself.

In an advantageous form of an embodiment, the configuration data structure comprises the configuration data of the device and/or the apparatus.

Here, in the event of a renewed connection of the device to the apparatus, a check must simply be made as to whether the same configuration data structure is present in the device and also in the apparatus. A transfer of the configuration data itself is not necessary, since these are already contained in the configuration data structure. The device and the apparatus can implement the appropriate configuration independently.

In a further advantageous form of an embodiment, the configuration data structure comprises a hash value of the configuration data, and the setting up of the device and/or the apparatus with the reactivated configuration data is then solely executed if the hash value of the reactivated configuration data agrees with the hash value in the configuration data structure.

By this means, any alteration or manipulation of the configuration data in the device and/or in the apparatus can be detected, and any implementation of an altered or manipulated configuration can thus be detected and prevented.

In an advantageous form of an embodiment, the configuration data are stored only after a successful test of the configuration.

By this means, a functioning configuration is ensured, both in the case of the first-time connection, and also in the event of any subsequent connection of the device to the apparatus.

In an advantageous form of an embodiment, the configuration data structure comprises information concerning the type of the device.

In the event of connection of another device of the same type to the apparatus, the other device can be automatically configured in accordance with the configuration data of a configuration data structure that is already present for the same type of device.

Thus, for example, in the course of a changeover of device or component a transfer of the data for the previous device of the same type can be executed automatically. By this means, for example, a simple changeover of a replacement part with subsequent autoconfiguration can be executed in accordance with the previous device that has been exchanged.

In an advantageous form of an embodiment, the configuration data structure comprises an item of information concerning a predetermined plant configuration version, and only a connection of device and apparatus with the same plant configuration identifier is authorized.

By this means, it can be ensured that an autoconfiguration is only executed between devices and/or apparatuses with identical configuration state. As a result it is impossible to connect together arbitrary devices.

In an advantageous form of an embodiment, the configuration data structure is stored only after a successful function test, and/or after a successful comparison of the device identification information and/or configuration data with previously configured data, and/or after a confirmation by an administrator.

With a recording of the configuration data structure after a successful function test, it is achieved that an identical configuration is reliably reactivated in the course of each replugging-in. If the configuration data structure is only stored after a successful comparison of the device identification information and/or the configuration data with previously configured data, then security rules can be linked with the identifiers, which rules must exist for an autoconfiguration. The confirmation of an administrator can, for example, ensure that devices that have not yet been connected to date can only be connected to an apparatus in a particular mode of operation, for example in a maintenance mode of the plant.

In an advantageous form of an embodiment, further configuration data structures with further related configuration data can be determined and stored for a device.

This enables various configurations to be authorized for a device/apparatus combination. Here, the said various configurations can be selected as a function of further parameters such as, for example, various plant configuration identifiers, so that a device can operate together with an apparatus in various plant configurations.

In an advantageous form of an embodiment, a device can be configured solely with the first-time configuration data structure and the related configuration data.

In an advantageous form of an embodiment, the configuration data structure has a temporal period of validity, which is prescribed by the device and/or by the apparatus.

In an advantageous form of an embodiment, after the expiry of a period of validity the configuration data structure is identified as stopped, or deleted.

In an advantageous form of an embodiment, the configuration data structure has a spatial period of validity, and a renewed connection of the device to the apparatus is only possible in the geographical region that corresponds to the spatial validity data.

In an advantageous form of an embodiment, the configuration data structure is used for the purposes of authenticating and/or authorizing the device and/or the apparatus in a subsequent communications connection.

By means of the configuration data structure, the exact device/apparatus combination is characterized and authenticated.

In a further advantageous form of an embodiment, the configuration data structure is used in the course of a key exchange in a subsequent communications connection of the device and/or the apparatus.

The inventive system for the deterministic autoconfiguration of a device in the course of connection to an apparatus comprises at least one device and at least one apparatus, wherein the device and the apparatus are designed so as to generate a device-specific configuration data structure in the event of a first-time connection of the device to the apparatus, wherein the said configuration data structure identifies the configuration data of the device and/or of the apparatus, which configuration data have been determined in the course of a first-time connection of the device to the apparatus. Furthermore, the device and the apparatus are designed so as to store the configuration data structure in the device and/or in the configuration, and in the event of a renewed connection of the device to the apparatus, determine the first-time configuration data of the device and/or the apparatus by means of the configuration data structure, and set up the device and/or the apparatus in accordance with the reactivated first-time configuration data.

Thus, in particular a functioning and tested configuration can be reproduced in the course of a renewed connection of the device to the apparatus, and can thus ensure the proper functioning of the apparatus with the device.

In an advantageous form of an embodiment of the system, the device is an internal component of the apparatus that can be plugged into an apparatus, or the device is a pluggable peripheral component of an apparatus, or the device is a network component, or an application on a network component, which is connected to the apparatus, which is a communications network with network components and/or control units.

Furthermore, a device and an apparatus are claimed, which are designed so as to execute the method as claimed in claims 1 to 16. Furthermore, a computer program product is claimed with program commands for the purposes of executing the method.

BRIEF DESCRIPTION

Some of the embodiments will be described in detail, with reference to the following figures, wherein like designations denote like members, wherein.

In all figures the parts corresponding to one another are allocated the same reference symbols.

DETAILED DESCRIPTION

Figure 1:
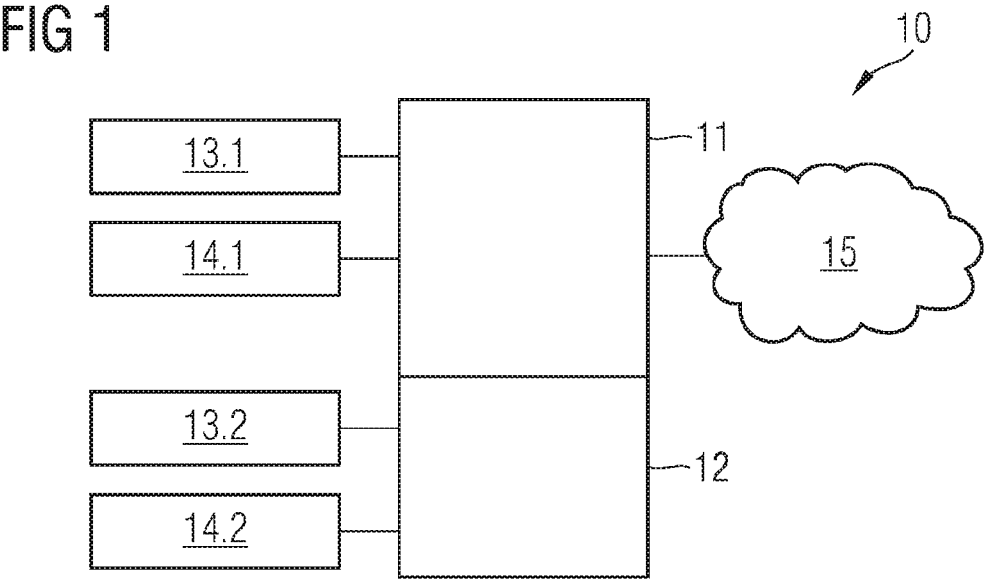
FIG. 1 shows a first example of embodiment of an inventive system in a schematic representation.
Figure 2:
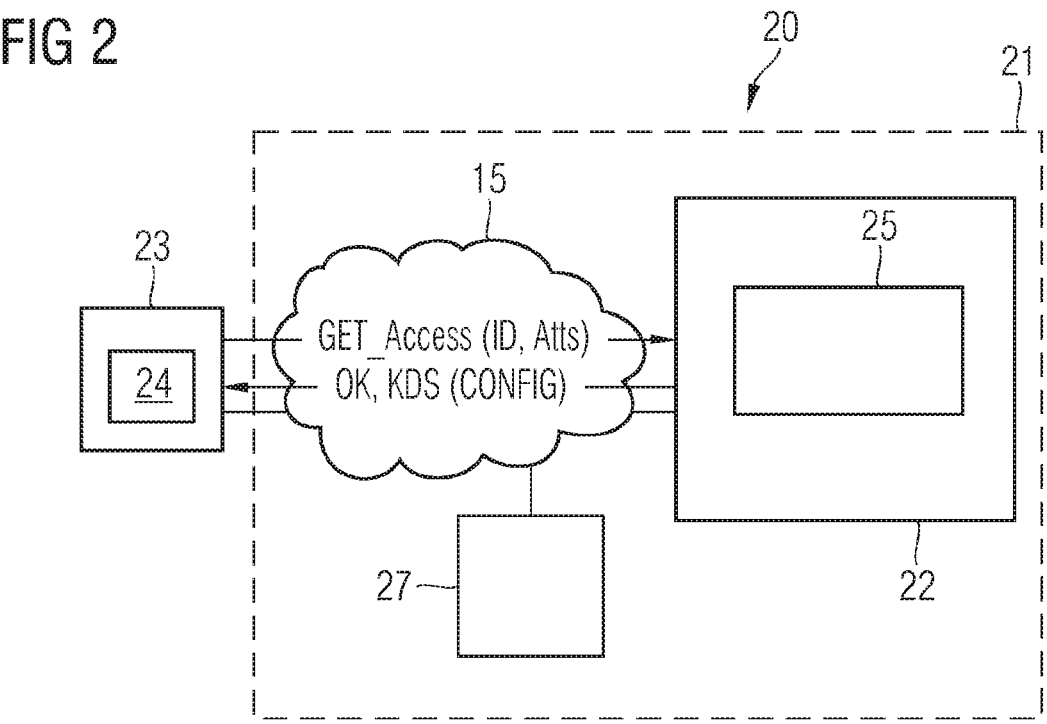
FIG. 2 shows a second example of embodiment of an inventive system with additional servers for the purposes of determining configuration data in a schematic representation.

By means of FIGS. 1 and 2 various systems are shown, in which an autoconfiguration of a device takes place in the course of connection to an apparatus. Hereinafter the terms "connect" and "plug in" are used synonymously.

The system 10 comprises various external devices 13.1, 13.4, which can, for example, be plugged into an apparatus 11 as pluggable peripheral components. Furthermore, a device 12, for example, an expansion card, is connected to the apparatus 11 as a pluggable internal component. The apparatus 11 can be, for example, a control device within an automation plant. The latter is connected to an automation network, here to the communications network 15. By means of autoconfiguration, sensors and/or actuators, here, for example, the devices 13.1, 13.4, can be connected to the apparatus 11, i.e. the control device. An expansion module, here the device 12, for example an input-output module, can also be connected to the apparatus 11, i.e. to the control device, by means of autoconfiguration. Sensors and/or actuators 13.2, 14.2 can in turn be plugged into the expansion module 12. In this case the expansion module 12 has the role of an apparatus, to which devices 13.2, 14.2 are connected.

In order that the apparatus 11, 12 can operate together with the connected devices 13.1, 14.1, and/or 13.2, 14.2, the devices 13.1, 14.1 and the apparatus 11 must be configured appropriately, i.e. communications parameters, such as, e.g. port numbers or addresses, must be arranged, for example, between the apparatus 11 and the device 13.1, 14.1. Furthermore, certain control functions in the devices 13.1, 14.1 can be activated and thus configured for the purposes of executing certain tasks in conjunction with the apparatus. Correspondingly adjustments can be made to the configuration of the apparatus 11, or also to further components, connected, for example, via the communications network 15.

In a first-time autoconfiguration procedure, a connection is made between a device and an apparatus, wherein the device is identified by the apparatus, and as a result the apparatus determines a configuration, and the said configuration is communicated to the device and activated, in order to utilize the device. This is represented in FIG. 2 with the example of a device 23, which is connected into a distributed system 20, for example, an automation network. Here the apparatus 21 is to be understood to be the communications network 15, with network components and/or control units, such as, for example, a configuration server 22 or a context server 27. After the device 23 has been connected via a communications network 15 to the apparatus 21, the device 23 establishes contact with, for example, the configuration server 22, and transfers device identification information ID and possibly further attributes Atts to the server 22. An autoconfiguration unit 25 in the configuration server 22 checks, for example by means of a security directive, whether the device 23 may be connected to the apparatus 21. Furthermore, the server 22, by interrogating a context server 27, can check whether, for example, a connection between the device 23 and the apparatus 21 is allowed in the current operating state of the system. If this is the case, a configuration unit 25 determines, for example, the configuration data CONFIG for the device 23, together with a device-specific configuration data structure KDS, and transmits these via the communications network 15 to the device 23. The exchange of messages is symbolized in FIG. 2 by the arrows.

The device 23 is subsequently configured in accordance with the received configuration data CONFIG. Here the configuration data structure KDS is stored either in the device 23, for example in a memory 24 provided for this purpose, or in the apparatus 21, for example in the configuration unit 25 in the configuration server 22, or in both.

If the device 23 is now separated from the apparatus 21, and at a later point in time is reconnected to the apparatus 21, the first-time configuration data CONFIG of the device 23 and/or the apparatus 21 are determined by means of the configuration data structure KDS, and the device 23 and/or the apparatus 21 are set up corresponding to the reactivated first-time configuration data. Here the configuration data can also relate to further network components, which must be adjusted in the course of a connection of the device 23 to the apparatus 21. The said configuration data are communicated to the other appropriate network components.

What is important in the event of a renewed connection of the device 23 to the apparatus 21 is the fact that the same configuration data are reused as in the case of the first-time connection of the device 23 to the apparatus 21. Here the configuration data structure KDS identifies the said first-time configuration and/or the corresponding configuration data.

In order to guarantee a functional system 10, 20, in an example of embodiment only such first-time configuration data and a related configuration data structure KDS are stored, if the corresponding configuration of the device and/or the apparatus has previously been tested successfully.

Figure 3:
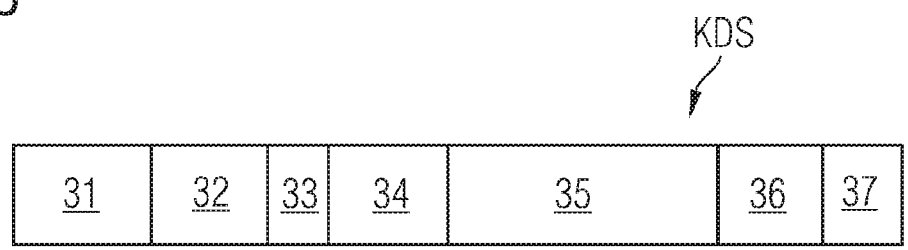
FIG. 3 shows an example of embodiment of an inventive configuration data structure in a schematic representation.

The configuration data structure KDS, as represented, for example, in FIG. 3, can thereby comprise various items of information and/or parameters, and according to the parameters and/or items of information included can be stored either in the device 23, or in the apparatus, or in both. In FIG. 3 an exemplary configuration data structure KDS is represented. The configuration data structure KDS comprises at least one or also a combination of the parameters and/or items of information shown.

In a first example of an embodiment, in the course of the first-time connection of the device 23 to the apparatus 21, for example in the configuration server 22 in FIG. 2, the configuration data are determined for the device and/or the apparatus 21.

Furthermore, a configuration data structure KDS is generated, which comprises, for example, the device identification information 31 of the device 23. Identified by the configuration data structure KDS, the configuration data determined are now stored, for example in a configuration unit 25 of the configuration server 22. In the event of a renewed connection of the device 23 to the apparatus 21, the device 23 transmits the device identification information 31 to the apparatus 21. Thereupon the apparatus 21 determines the configuration data structure KDS with the corresponding device identification information 31 and the configuration data additionally stored. These are transmitted to the device 23 and the device is there set up accordingly.

In addition, a hash value 34 can be contained in the configuration data structure KDS; this has been formed from the first-time configuration data. In this case the device 23 reactivates the first-time configuration data only if a hash value, formed by the device 23 via the configuration data delivered from the apparatus 21, agrees with the hash value 34 in the configuration data structure. Thus any alteration of the configuration data sent from the apparatus, compared with the first-time configuration data, is detected, and any implementation is prevented.

The configuration data structure KDS can also contain a configuration identifier 32. Instead of the device identification information 31 the said configuration identifier 32 can be transmitted in the event of a renewed connection of the device 23 to the apparatus 21. In this case the first-time configuration data of the device 23 can also be identified in the apparatus 21 with this configuration identifier 32 and stored accordingly.

In addition, the configuration data structure KDS can comprise information concerning the type 33 of the device 23. If the device 23 transmits the said configuration data structure KDS in the course of a renewed connection to the apparatus 21, a transfer of configuration data of the same device type can take place, dependent, for example, upon a security directive set up in the system 22. This makes possible, for example, the exchange of identical devices, or of replacement parts, which are configured in accordance with the previous device. If the device 23 delivers an item of information concerning the device type 33 for which no first-time configuration data are present in the apparatus 21, an error message or an alarm is outputted.

The configuration data structure KDS can comprise further information such as, for example, a plant configuration identifier 36. The latter is utilized for the purpose of executing only one autoconfiguration of device and apparatus with a particular, and/or with an identical, plant configuration state, which is expressed in terms of the same plant configuration identifier 36. Thus it is ensured that only devices with, for example, the same configuration version, that is to say, with the same configuration state, are used in a plant.

The configuration data structure KDS can comprise further parameters 37, for example, a temporal period of validity or spatial validity data. The temporal period of validity can be prescribed by the device 23 and/or by the apparatus 21. After expiry of the period of validity the configuration data structure KDS is identified as blocked, or deleted. In this manner a later unintentional reactivation of the configuration data in the course of connecting the device to the apparatus is no longer possible. Similarly devices 23 are thus prevented from being configured with an outdated configuration and newly introduced into a system.

By virtue of the spatial validity data the execution of an autoconfiguration with the stored first-time configuration data is only newly authorized if the configuration of the device takes place in a predetermined spatial environment, for example in the same environment as in the case of the first-time configuration, in the course of which the configuration data structure KDS and the related first-time configuration data have been stored.

However, a configuration data structure KDS can also contain the configuration data itself, and/or a description of the configuration data 35. If such a configuration data structure KDS with a description of the configuration data 35 is generated in the course of a first-time connection of the device 23 to the apparatus 21, and is stored both in the device and in the apparatus, in the event of a later renewed connection of the device 23 to the apparatus 21 all that is necessary is, for example, the transmission of one of the parameters of the configuration data structure KDS from the device 23 to the apparatus 21, and a confirmation of the said parameter of the configuration data structure by the apparatus 21. Thereupon the device 23 can independently extract the configuration data 35 from the configuration data structure KDS and implement the same. For its part the apparatus 21 can do the same. By this means the quantity of data to be transferred is reduced, less bandwidth is required, and any manipulation of the configuration data on the transfer path is prevented.

If in contrast to the above only the device identification information 31 is contained in the configuration data structure KDS, and in the apparatus a linking of the device identification information 31 with the first-time configuration data, then even very simply structured devices 23 can execute a deterministic autoconfiguration, since only the device identification information 31 needs to be stored on the device, but not any other configuration data. The latter are transmitted from the apparatus 21 to the device 23.

In one form of an embodiment, the configuration data structure KDS is only stored in the device 23 and/or in the apparatus 21 after a successful function test. This ensures that an identical configuration is reliably reactivated in the course of each further plugging of the device 23 into the apparatus 21. However, the configuration data structure KDS can also only agree with previously established data, for example, from planning data and/or with a previously established system configuration, after a successful comparison of the device identification information 31 and/or the configuration data. However, the storage of the configuration data structure KDS can also take place only if the latter is confirmed by an administrator. Thus it can come about, for example, that a device that has not yet been used is connected and utilized only in a particular mode of operation.

Devices 13, 14, 23 can determine and store further configuration data structures KDS with further related configuration data. Such devices 13, 14, 23 can, for example, comprise various configuration data structures for the purposes of connecting to various apparatuses 11, 12. A device can, however, also have a plurality of configuration data structures for the purposes of renewed connection to the same apparatus 11; the said configuration data structures belonging, for example, to various plant configuration versions. Thus, one autoconfiguration can be retained for various plant configuration versions.

On the other hand, there are devices that can be reactivated only with the first-time configuration data structure and the related configuration data, in the event of a renewed connection to the apparatus. Here any alteration of the configuration after the first-time connection of the device 13, 14, 23 to the apparatus 11, 12, 21 is not authorized.

In one variant a configuration data structure KDS can be utilized in the authentication phase of a subsequent communications connection. For this purpose the configuration data structure KDS is sent along at the same time as a parameter, or an attribute certificate, in the course of the device authentication. With the use of the configuration data structure in the course of an authorization it can be ensured that the device may only construct a communications connection in a certain configuration, and that this also can be checked at the remote station, that is to say, at the communications partner.

The configuration data structure KDS can also be used in the key exchange phase of a subsequent communications connection. In this manner it can be ensured, for example, that a session key is tied to an existing configuration, and cannot inadvertently be used by the device in the event of any change of the configuration. This is particularly of advantage if the configuration of a device has altered between two autoconfiguration activities. The apparatus 21 is designed, as are the apparatuses 11 and 12, such that the functions and methods described can be executed on them. The same is true for the devices 12, 13, 14, 23 described, together with the systems 10 and 20.

Figure 4:
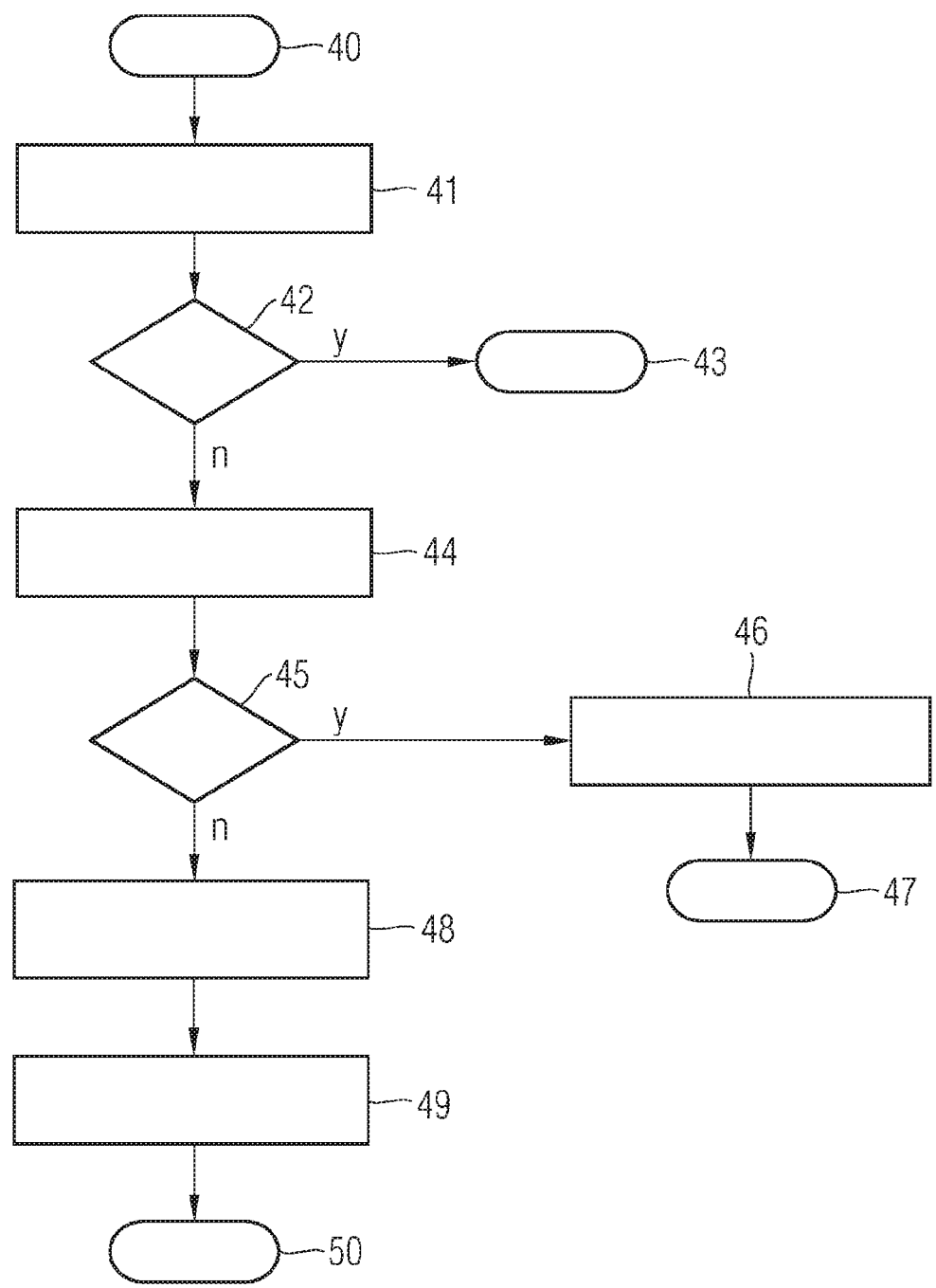
FIG. 4 shows an example of embodiment of the inventive method as a flow chart.

In FIG. 4, a sequence is represented for a deterministic autoconfiguration by means of a flow chart. The autoconfiguration process begins in step 40, in that a device 12, 13, 14, 23 is plugged into, that is to say, is connected to, an apparatus 11, 12, 21. In step 41, for example, identification data of the plugged-in device are firstly transmitted to the apparatus 11, 12, 21, and are there checked in accordance with, for example, a security directive. If in step 42 any deviation of the device from the security directive is established, for example, an error message is outputted in step 43, and no configuration is executed.

If no deviation is established in step 42 a check is made in the device 13, 14, 23 and/or in the apparatus 11, 12, 21 as to whether a configuration data structure KDS is present in the local memory, see step 44. If it ensues in step 45 that no configuration data structure KDS is yet present, a configuration data structure KDS is generated and stored in accordance with one of the examples cited above, see step 48. In step 49 the configuration is set up in the device and/or in the apparatus. In step 50 the autoconfiguration process is therefore completed. The device 13, 14, 23 can then operate together with the apparatus 11, 12, 21 in its configuration as determined.

If the device 13, 14, 23 is separated, that is to say, unplugged, from the apparatus 11, 12, 21, the method as described begins once again with step 40, with a renewed plugging of the device 13, 14, 23 into the apparatus 11, 12, 21.

If the identification data, which in step 41 are transmitted to the apparatus, are already part of the configuration data structure KDS, then step 41 corresponds to step 44, and the process can then be pursued further directly with step 46, namely the reading of the configuration data structure KDS and the reactivation of the first-time configuration data.

Thus, on the one hand the flexibility of an autoconfiguration is utilized, for example for applications in an automation environment, and at the same time stable operation of an automation plant is ensured by means of the first-time configuration data that have already been checked.

Although the present invention has been disclosed in the form of preferred embodiments and variations thereon, it will be understood that numerous additional modifications and variations could be made thereto without departing from the scope of the invention.

For the sake of clarity, it is to be understood that the use of 'a' or 'an' throughout this application does not exclude a plurality, and 'comprising' does not exclude other steps or elements.

The invention claimed is:

1. A method for deterministic autoconfiguration of a device in the course of a connection, the method comprising:
providing an apparatus wherein the device is capable of being connected to the apparatus, wherein there is no configuration data structure present assigned to the apparatus and to the device before a first-time connection of the device to the apparatus;
in an event of the first-time connection of the device to the apparatus, generating a device-specific configuration data structure, wherein the configuration data structure identifies a configuration data of the device and the apparatus, the configuration data having been determined in a course of the first-time connection of the device to the apparatus, and storage of the configuration data structure in the device and/or in the apparatus, further wherein the configuration data structure comprises a configuration identifier, which is determined in the course of the first-time connection of the device to the apparatus, and
in the event of a renewed connection of the device to the apparatus, determining the first-time configuration data of the device and the apparatus by means of the configuration identifier, and setting up of the device and/or the apparatus with the first-time configuration data, wherein any alteration of the configuration data structure prevents setting up of the device and/or the apparatus.

2. The method as claimed in claim 1, wherein fixedly prescribed device identification information, which is transmitted from the device at least in the case of the first-time connection to the apparatus for the purposes of identifying the device, is recorded in the configuration data structure and the first-time configuration data of the device and the apparatus are determined by means of the device identification information.

3. The method in accordance with claim 1, wherein the configuration data structure comprises a hash value of the configuration data, and the setting up of the device and/or the apparatus with a reactivated configuration data is then solely executed if the hash value of the reactivated configuration data agrees with the hash value in the configuration data structure.

4. The method in accordance with claim 1, wherein configuration data are stored only after a successful test of the configuration data.

5. The method in accordance with claim 1, wherein the configuration data structure comprises information concerning a type of the device.

6. The method in accordance with claim 1, wherein the configuration data structure comprises a plant configuration identifier, and only a connection of a device to an apparatus with a particular plant configuration identifier and/or the same plant configuration identifier is authorized.

7. The method in accordance with claim 1, wherein the configuration data structure is stored in the device and/or in the apparatus only after a successful function test, and/or after a successful comparison of a device identification information, and/or after a successful comparison of the configuration data with previously established data, and/or after a confirmation by an administrator.

8. The method in accordance with claim 7, wherein further configuration data structures with further related configuration data is determined and stored for a device.

9. The method in accordance with claim 1, wherein in the course of a renewed connection to the apparatus, a device is configured solely with the first-time configuration data structure and related configuration data.

10. The method in accordance with claim 1, wherein the configuration data structure has a temporal period of validity, which is prescribed by the device and/or by the apparatus.

11. The method in accordance with claim 10, wherein after an expiry of the period of validity, the configuration data structure is identified as blocked, or deleted.

12. The method in accordance with claim 1, wherein the configuration data structure has a spatial validity data, and a renewed connection of the device to the apparatus is only possible in a geographical region that corresponds to the spatial validity data.

13. The method in accordance with claim 1, wherein the configuration data structure is used for the purposes of authenticating and/or authorizing the device and/or the apparatus in a subsequent communications connection.

14. The method in accordance with claim 1, wherein the configuration data structure is used in the course of a key exchange in a subsequent communications connection of the device and/or the apparatus.

15. The method of claim 1, wherein if alteration of the configuration data structure is detected in the event of a renewed connection of the device to the apparatus an error message is outputted.

16. A computer program product, comprising a computer readable storage device storing a computer readable program code, the computer readable program code comprising program commands for the purposes of executing the method in accordance with claim 1.

17. A system for the deterministic autoconfiguration of a device in the course of a connection, comprising the device and at least one apparatus, wherein the system is configured such that:

there is no configuration data structure assigned to the at least one apparatus and to the device before a first-time connection of the device to the at least one apparatus, in the event of a first-time connection of the device to the at least one apparatus, the at least one apparatus determines a device specific configuration data structure, wherein the configuration data structure identifies the configuration data of the device and the at least one apparatus, the configuration data having been determined in the course of the first-time connection of the device to the at least one apparatus, and the configuration data structure is stored in at least one of the device and the at least one apparatus, further wherein the configuration data structure comprises a configuration identifier, which is determined in the course of the first-time connection of the device to the apparatus, and in the event of a renewed connection of the device to the at least one apparatus, at least one of the device and the at least one apparatus determine the first-time configuration data of the device and the at least one apparatus by means of a configuration identifier, and are set up with the reactivated first-time configuration data, wherein any alteration of the configuration data structure prevents set up of the device and/or the at least one apparatus.

18. The system as claimed in claim 17, wherein the device is an internal component of the at least one apparatus that is plugged into the at least one apparatus, or the device is a pluggable peripheral component of the at least one apparatus, or the device is a network component, or an application on a network component, which is connected to the at least one apparatus, which is a communications network with network components and/or control units.

* * * * *